US012676561B2

(12) United States Patent
Fan et al.

(10) Patent No.: US 12,676,561 B2
(45) Date of Patent: Jul. 7, 2026

(54) SWITCHING-CYCLE VOLTAGE DEVIATION CONTROL FOR MODULAR MULTILEVEL CONVERTERS

(71) Applicant: VIRGINIA TECH INTELLECTUAL PROPERTIES, INC., Blacksburg, VA (US)

(72) Inventors: Boran Fan, Blacksburg, VA (US); Dushan Boroyevich, Blacksburg, VA (US); Rolando Burgos, Blacksburg, VA (US); Jayesh Kumar Motwani, Blacksburg, VA (US); Jun Wang, Lincoln, NE (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 466 days.

(21) Appl. No.: 17/932,079

(22) Filed: Sep. 14, 2022

(65) Prior Publication Data
US 2024/0088800 A1 Mar. 14, 2024

(51) Int. Cl.
$\quad$ *H02M 7/5395* $\quad$ (2006.01)
$\quad$ *H02M 1/00* $\quad$ (2006.01)
$\quad$ *H02M 7/483* $\quad$ (2007.01)
(52) U.S. Cl.
$\quad$ CPC ....... *H02M 7/4835* (2021.05); *H02M 1/0043* (2021.05); *H02M 7/5395* (2013.01)
(58) Field of Classification Search
$\quad$ CPC ............. H02M 1/0043; H02M 7/4835; H02M 7/5395; H02M 7/483; H02M 7/487;

H02M 7/49; H02M 7/493; H02M 7/48; H02M 7/539; H02M 7/5387; H02M 7/53871; H02M 7/53875
See application file for complete search history.

(56) References Cited

U.S. PATENT DOCUMENTS

| | | | | |
|---|---|---|---|---|
| 9,966,874 | B2 * | 5/2018 | Wang ..................... | H02M 7/483 |
| 10,637,343 | B2 * | 4/2020 | Fujii ....................... | H02M 7/48 |
| 11,368,103 | B2 * | 6/2022 | Wang ..................... | H02M 1/08 |

(Continued)

OTHER PUBLICATIONS

A. J. Korn, M. Winkelnkemper, and P. Steimer, "Low output frequency operation of the modular multi-level converter," in Proc. IEEE Energy Convers. Congr. Expo., Atlanta, Ga, USA, 2010, pp. 3993-3997.

(Continued)

*Primary Examiner* — Nguyen Tran
(74) *Attorney, Agent, or Firm* — Perilla Knox & Hildebrandt LLP; Jonathan A. Paulis

(57) ABSTRACT

Aspects of switching-cycle voltage deviation control for modular multilevel converters (MMCs) are described. In one example, an upper switching action of an upper power cell is determined within a time duration of a switching cycle for an MMC. In addition, a lower switching action of a lower power cell is determined within the time duration of the switching cycle for the MMC. In addition, a delay is generated between the upper switching action and the lower switching action to reduce capacitor voltage deviation between the upper power cell and the lower power cell during the switching cycle. The upper power cell is located in an upper arm of a phase leg of the MMC, while the lower power cell is located in a lower arm of the phase leg of the MMC.

18 Claims, 4 Drawing Sheets

(56) References Cited

U.S. PATENT DOCUMENTS

2021/0399725 A1* 12/2021 Outram ............... H02M 7/4835
2021/0408937 A1* 12/2021 Bhattacharya ...... H02M 1/0003

OTHER PUBLICATIONS

A. Mertens and J. Kucka, "Quasi two-level PWM operation of an MMC phase leg with reduced module capacitance," IEEE Trans. Power Electron., vol. 31, No. 10, pp. 6765-6769, Oct. 2016.

B. Fan et al., "Cell Capacitor Voltage Switching-Cycle Balancing Control for Modular Multilevel Converters," in IEEE Transactions on Power Electronics, vol. 37, No. 3, pp. 2525-2530, Mar. 2022, doi:10.1109/TPEL.2021.3116803.

B. Fan, K. Wang, P. Wheeler, C. Gu, and Y. Li, "An optimal full frequency control strategy for the modular multilevel matrix converter based on predictive control," IEEE Trans. Power Electron., vol. 33, No. 8, pp. 6608-6621, Aug. 2018.

B. Fan, Y. Li, K.Wang, Z. Zheng, and L. Xu, "Hierarchical system design and control of an MMC-based power-electronic transformer," IEEE Trans. Ind. Informat., vol. 13, No. 1, pp. 238-247, Feb. 2017.

H. Tian and Y. W. Li, "Carrier-based stair edge PWM (SEPWM) for capacitor balancing in multilevel converters with floating capacitors," IEEE Trans. Ind. Appl., vol. 54, No. 4, pp. 3440-3452, Jul./Aug. 2018.

J. Wang, R. Burgos, D. Boroyevich, and Z. Liu, "Design and testing of 1 kV H-bridge power electronics building block based on 1.7 kV SiC MOSFET module," in Proc. Int. Power Electron. Conf., Niigata, Japan, 2018, pp. 3749-3756.

K. Ilves, S. Norrga and H. -P. Nee, "On energy variations in modular multilevel converters with full-bridge submodules for Ac-Dc and Ac-Ac applications," 2013 15th European Conference on Power Electronics and Applications (EPE), Lille, France, Sep. 2013, pp. 1-10.

K.Wang, Y. Li, Z. Zheng, and L. Xu, "Voltage balancing and fluctuation suppression methods of floating capacitors in a new modular multilevel converter," IEEE Trans. Ind. Electron., vol. 60, No. 5, pp. 1943-1954, May 2013.

M. Hagiwara, I. Hasegawa, and H. Akagi, "Start-up and low-speed operation of an electric motor driven by a modular multilevel cascade inverter," IEEE Trans. Ind. Appl., vol. 49, No. 4, pp. 1556-1565, Jul./Aug. 2013.

M. Winkelnkemper, A. Korn, and P. Steimer, "A modular direct converter for transformerless rail interties," in Proc IEEE Int. Symp. Ind. Electron., Bari, Italy, 2010, pp. 562-567.

S. Mocevic et al., "Power cell design and assessment methodology based on a high-current 10-kV SiC MOSFET half-bridge module," IEEE J. Emerg. Sel. Topics Power Electron., vol. 9, No. 4, pp. 3916-3935, Aug. 2021.

* cited by examiner

503

506

509

512

SWITCHING-CYCLE VOLTAGE DEVIATION CONTROL FOR MODULAR MULTILEVEL CONVERTERS

STATEMENT REGARDING FEDERALLY SPONSORED RESEARCH OR DEVELOPMENT

This invention was made with government support under grant number DEAR0000892, awarded by ARPAe. The government has certain rights in the invention.

BACKGROUND

A modular multilevel converter (MMC) is a transformer-less power converter suitable for use in high or medium voltage power conversion applications. MMCs can be used to convert power between direct current (DC) and alternating current (AC) systems, for example, at relatively high voltages without the use of transformers. Because of their flexibility and relatively small size, MMCs are an attractive solution for high voltage, high power applications, among others. Transformer-less unidirectional or bidirectional AC to DC interface power converter systems can be implemented for example, to connect DC nanogrids to AC utility grids. Compared with isolated topologies, the non-isolated topology of transformer-less AC-DC interface power converter systems is relatively simpler and generally more efficient.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Modular multilevel converters (MMCs) feature modular design, scalability, high power quality, and resilience. However, MMCs with conventional controls can be subject to large cell capacitor voltage ripples, especially at low-line-frequencies. These voltage ripples are exacerbated by capacitive energy oscillations and imbalances between two arms in one phase leg of MMCs. Generally, it has been found that the voltage ripples can be attenuated by appropriately utilizing the control freedom of the circulating current or the common-mode voltage.

Conventional MMC controls adopt a compulsory DC circulating current to balance active power. As a result, MMC cell capacitor voltage ripples can be inversely proportional to the fundamental (switching) frequency, leading to large energy variation at low frequencies. One shared design feature of existing control approaches is that the change of the reference common-mode voltage (CMV) and circulating current are controlled at a frequency that is one order of magnitude slower than the switching frequency, which limits the potential of control performances. In order to overcome the shortcomings discussed above, a control scheme is proposed that reduces capacitor voltage deviation among switching submodules in a MMC in the context of a switching cycle.

One of the challenges of using a MMC for these applications can be to minimize capacitor voltage ripples in switching power cells of the MMC. A conventional approach of using a large capacitance in the switching power cells can increase the volume and cost of MMCs. Additionally, conventional approaches adopt a compulsory DC circulating current to balance active power, which limits control performance. Aspects of the embodiments described herein enable the control of switching power cells in a MMC in the timescale of a switching cycle of the MMC, which minimizes capacitor voltage ripples in the switching power cells in an effective manner, and in some cases, eliminates or nearly eliminates capacitor voltage ripples in the switching power cells in the timeframe of the switching cycle.

In the context outlined above, switching-cycle voltage deviation control for modular multilevel converters (MMCs) is proposed and described herein. In one example, an upper switching action of an upper power cell is determined within a time duration of a switching cycle for an MMC. In addition, a lower switching action of a lower power cell is determined within the time duration of the switching cycle for the MMC. Further, a delay is generated between the upper switching action and the lower switching action to reduce capacitor voltage deviation between the upper power cell and the lower power cell during the switching cycle. The upper power cell can be located in an upper arm of a phase leg of the MMC, while the lower power cell can be located in a lower arm of the phase leg of the MMC.

Figure 1:
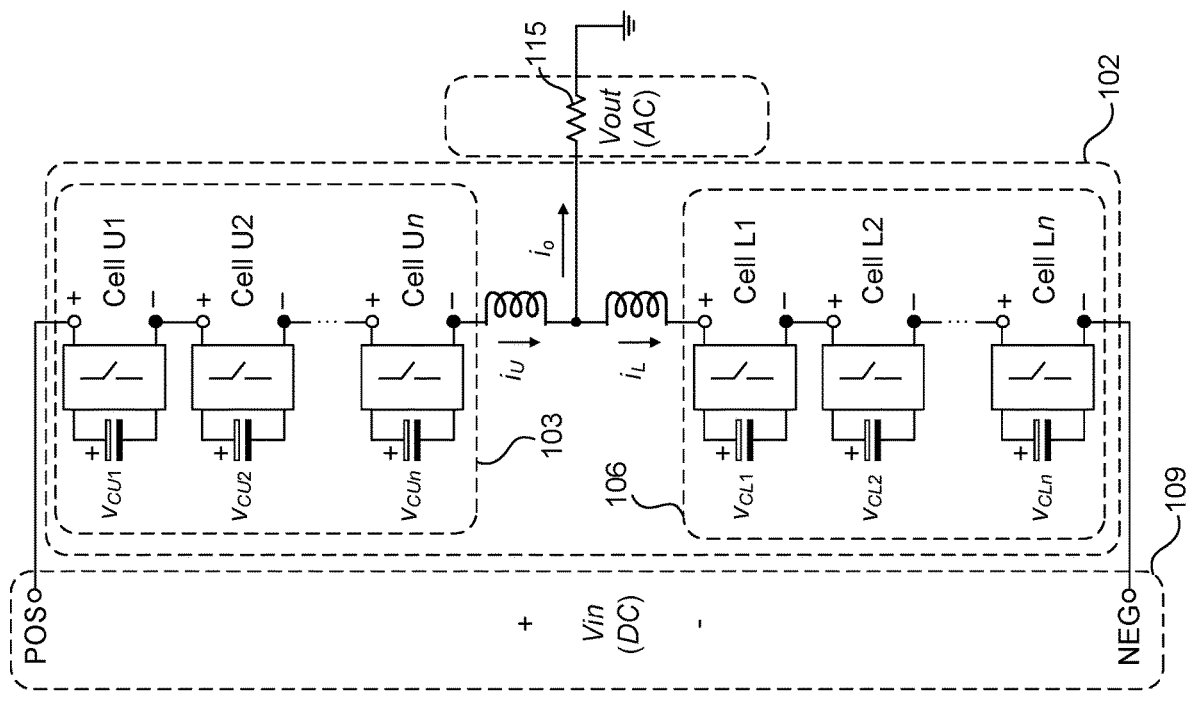
FIG. 1 illustrates an example modular multilevel converter (MMC) in accordance with various embodiments described herein.
Figure 1:
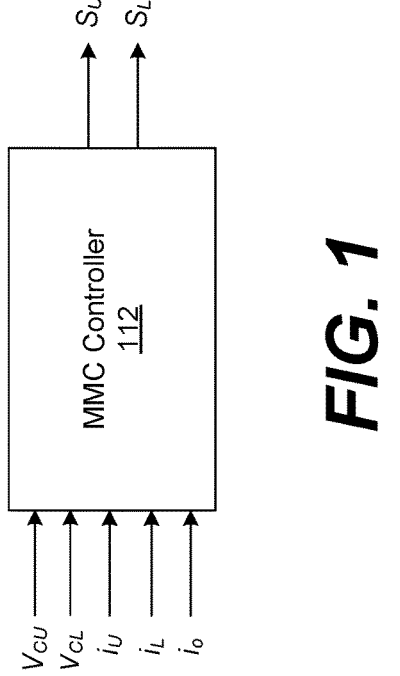
Figure 1:

Referring now to the drawings, FIG. 1 illustrates an example modular multilevel converter 102 ("MMC 102") for use in an exemplary power converter system 100 in accordance with various embodiments described herein. The power converter system 100 includes the MMC 102, a DC link 109, a load 115, and an MMC controller 112. The converter system 100 is illustrated as a representative example in FIG. 1, to explain the concepts of the embodiments described herein. The converter system 100 is not exhaustively illustrated, and one or more components of the converter system 100 may be omitted in practice although shown. Alternatively, one or more of the components of the converter system 100 shown in FIG. 1 can be omitted.

The MMC 102 is a power converter designed to convert input DC power (e.g., Vin) to output AC power (e.g., Vout). One phase leg of the MMC 102 is illustrated in FIG. 1 for simplicity. The phase leg provides one phase of AC output power by the MMC 102. Although a single phase leg is illustrated in the MMC 102 in FIG. 1, the MMC 102 can include any number of phase legs corresponding to the number of phases of AC power output needed, depending on the application for use of the MMC 102. A load 115 is connected to the output of the phase leg of the MMC 102 in FIG. 1. The load 115 is representative of any load for the MMC 102 and can incorporate resistive and reactive components.

The phase leg of the MMC 102 includes an upper arm 103 and a lower arm 106. The upper arm 103 includes upper power cells U1, U2, . . . to Un, and the lower arm 106 includes lower power cells L1, L2, . . . to Ln, with n being an integer corresponding to an expandable quantity of cells in each phase leg of the MMC 102. In the example shown, the phase leg of the MMC 102 can have an expandable amount of power cells in the upper arm 103 and the lower arm 106. For example, if n corresponds to a value of 5, the upper power cells U1, U2, . . . to Un can include cells U1-U5 and the lower power cells L1, L2, . . . to Ln can include cells L1-L5. Accordingly, the upper arm 103 and the lower arm 106 can include a cascaded (e.g., series) arrangement of switching submodules (power cells). For example, the upper power cells U1, U2, . . . to Un can be electrically coupled together in a series or cascade arrangement to feed power to a first output tap of an AC power grid or system. Similarly, the lower power cells L1, L2, . . . to Ln can be electrically coupled together in a series or cascade arrangement to feed power to the first output tap of the AC power grid or system.

Figure 2:
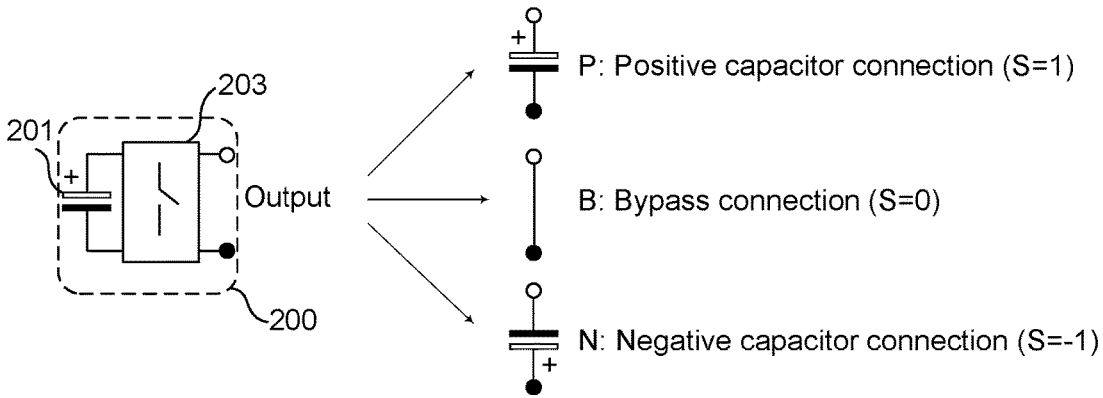
FIG. 2 illustrates an example power cell and various output connections provided by a switch network for each power cell in the MMC shown in FIG. 1 in accordance with various embodiments described herein.

Each of the upper power cells U1, U2, . . . to Un in the upper arm 103 and the lower power cells L1, L2, . . . to Ln in the lower arm 106 include a capacitor and a switch network. As an example, FIG. 2 illustrates an example power cell 200 and various output connections provided by a switch network for the power cell 200. Each of the upper power cells in the upper arm 103 and the lower power cells in the lower arm 106 can be embodied by a power cell similar to the power cell 200.

As shown, the power cell 200 includes a capacitor 201 and a switch network 203. The capacitor 201 can be embodied as any suitable type of capacitor (or parallel arrangement of capacitors) having a capacitance based on the application for use of the MMC 102, the input Vin and output Vout voltages of the MMC 102, the load placed on the MMC 102, the frequency of the AC output power of the MMC 102, the power handling capacity of the MMC 102, and other factors.

The switch network 203 can include an arrangement of switching power transistors, which can be embodied as any suitable type of semiconductor (or other) power switches, such as power bipolar transistors or power insulated gate bipolar transistors (IGBTs), among others, depending upon the switching frequency of the MMC 102 and other factors. However, certain semiconductor power switches, such as IGBTs, may not be suitable for use at higher speed switching frequencies. For higher speed switching operations according to aspects of the embodiments described herein, the switch network 203 can be embodied as metal oxide semiconductor field effect transistors (MOSFETs), such as silicon carbide (SiC) MOSFETs. In any given power cell of the upper arm 103 or the lower arm 106, the topology or arrangement of the switch network 203 can be full bridge, semi full bridge, half bridge, or another topology or arrangement.

FIG. 2 also illustrates examples of the available output connections (switching states) of the switch network 203. Particularly, the switch network 203 can couple the capacitive plates of the capacitor 201 to the output terminals of the power cell 200 in the configurations shown in FIG. 2, based on the switch control signal S. The switch control signal S operates the switching states or actions provided by the switch network 203. For example, the available switching states of the switch network 203 include a positive capacitor connection (e.g., S=1), a bypass or short connection (e.g., S=0), and a negative capacitor connection (e.g., S=−1).

The switch network 203 can include a circuit topology that can achieve two or three of the above-mentioned connections. For example, if the switch network 203 is embodied as a half bridge, the available connections may be the positive capacitor connection and the bypass connection. If the switch network 203 is embodied as a full bridge, the available connections may include all three of the above-mentioned connections. Based on the switching states provided by the switch network 203 in each of the upper power cells U1, U2, . . . to Un and the lower power cells L1, L2, . . . to Ln, the capacitor of each of the upper power cells U1, U2, . . . to Un and the lower power cells L1, L2, . . . to Ln may be charged or discharged during a switching cycle for the MMC 102.

A switching action can be described in terms of a switch between the switching states described above. For example, a switching action can include a switch from a "high-level" state to a "low-level" state, or from a low-level state to a high-level state. If the positive capacitor connection (S=1) is used as the "high-level" state, the bypass or short connection (S=0) and the negative capacitor connection (S=−1) are available as the "low-level" states. If the bypass or short connection (S=0) is used as the high-level state, then the negative capacitor connection (S=−1) is available as the low-level state.

Figure 3:
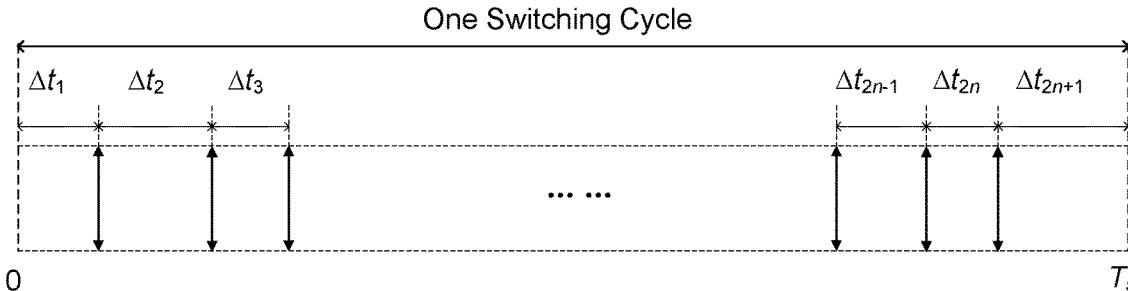
FIG. 3 illustrates exemplary time duration sections of a switching cycle for the MMC shown in FIG. 1 along with switching actions available for each time duration in accordance with various embodiments described herein.

The switching actions of the power cells in the upper arm 103 and the lower arm 106 are controlled over a switching cycle of the MMC 102. A switching cycle of the MMC 102 is the period of time $T_s$ during which the power cells (cells U1, U2, . . . to Un or L1, L2, . . . to Ln) of the upper arm 103 and the lower arm 106 complete a switching cycle (e.g., switch from a low-level to a high level state and then back to a low-level state, or switch from a high-level to a low-level state and then back to a high-level state). Each switching cycle can be divided into a number of time durations. For example, FIG. 3 illustrates exemplary time duration sections of a switching cycle of the MMC 102 in accordance with various embodiments described herein. The switching cycle depicted in FIG. 3 includes a switching cycle $T_s$, which can be broken down into 2n+1 time duration sections according to various embodiments. This results in each time duration section $\Delta t_i$ ranging from $\Delta t_1$ to $\Delta t_{2n+1}$.

In FIG. 3, each bidirectional arrow indicates a possible switching action of the switch network 203 for each of the upper power cells U1, U2, . . . to Un and the lower power cells L1, L2, . . . to Ln. As discussed above, the possible switching actions include either a rising edge, from a low-level to a high-level state, or a falling edge, from a high level to a low-level state. According to various embodiments, one or more of the upper power cells U1, U2, . . . to Un or the lower power cells L1, L2, . . . to Ln may complete a full switching cycle, such as a switch from the low-level to the high-level and back to the low-level, during the time duration $T_s$. In some embodiments, only a subset of the upper power cells U1, U2, . . . to Un and the lower power cells L1, L2, . . . to Ln may complete a full switching cycle during the time duration $T_s$. In some cases, one or more of the upper power cells U1, U2, . . . to Un or the lower power cells L1, L2, . . . to Ln may maintain a high-level state or a low-level state for the time duration $T_s$.

The MMC controller 112 is configured to generate and provide switching control signals to the switch network 203 of each of the upper power cells U1, U2, . . . to Un and the lower power cells L1, L2, . . . to Ln. As shown in FIG. 1, the MMC controller 112 generates upper switching control signals $S_U$ to the power cells in the upper arm 103, and the MMC controller 112 generates lower switching control signals $S_L$ to the power cells in the lower arm 106. The switching control signals $S_U$ and $S_L$ direct the switch network 203 of each of the upper power cells U1, U2, . . . to Un and the lower power cells L1, L2, . . . to Ln.

During a switching cycle, the MMC controller 112 can generate the switching control signals $S_U$ and $S_L$ to maintain either a low-level or a high-level state, to switch from a low-level to a high-level state, or to switch from a high-level to a low-level state as one switching action, for each of the upper power cells U1, U2, . . . to Un and the lower power cells L1, L2, . . . to Ln. The MMC controller 112 can receive various inputs to determine the switching control signals $S_U$ for the upper power cells U1, U2, . . . to Un of the upper arm 103 and the switching control signals $S_L$ for the lower power cells L1, L2, . . . to Ln of the lower arm 106. Inputs to the MMC controller 112 can include the voltages $V_{CU}$ across the capacitors of the upper power cells U1, U2, . . . to Un and the voltages $V_{CL}$ across the capacitors of the lower power cells L1, L2, . . . to Ln. The inputs can further include the upper arm current $i_U$, the lower arm current $i_L$, and the output current $i_o$, among others. Based on the inputs, the MMC controller 112 can be configured to determine the switching control signals $S_U$ and $S_L$ of the upper power cells U1, U2, . . . to Un and the lower power cells L1, L2, . . . to Ln, which control the switching actions of those power cells. The MMC controller 112 also generates the switching control signals $S_U$ and $S_L$ to reduce capacitor voltage deviation among the power cells of the upper arm 103 and the lower arm 106 during the switching cycle, as described herein.

The MMC controller 112 can be embodied in the form of hardware, firmware, software executable by hardware, or any combination thereof. More particularly, the MMC controller 112 can be embodied as processing circuitry, including memory, configured to control the operation of the MMC 102, with or without feedback. The MMC controller 112 can be embodied as any suitable type of controller, such as a proportional integral derivative (PID) controller, a proportional integral (PI) controller, or a multi-pole multi-zero controller, among others, to control the operations of MMC 102. The MMC controller 112 can be realized using a combination of processing circuitry and referenced as a single controller. It should be appreciated, however, that the MMC controller 112 can be realized using a number of controllers, control circuits, drivers, and related circuitry, operating with or without feedback. For example, in some embodiments, the MMC controller 112 may include one or more controllers to separately control the switching control signals $S_U$ of the upper power cells U1, U2, . . . to Un and the switching control signals $S_L$ of the lower power cells L1, L2, . . . to Ln (e.g., a controller to control the switching control signals $S_U$ of the upper power cells U1, U2, . . . to Un and a separate controller to control the switching control signals $S_L$ of the lower power cells L1, L2, . . . to Ln).

Capacitor voltages for the upper power cells of the upper arm 103, including power cells U1, U2, . . . to Un, are denoted as $v_{CU1}$, $v_{CU2}$, . . . $v_{CUn}$, respectively, in FIG. 1. Capacitor voltages for the lower power cells of the lower arm 106, including power cells L1, L2, . . . to Ln, are denoted as $v_{CL1}$, $v_{CL2}$, . . . $v_{CLn}$, respectively. Upper and lower arm currents are denoted as $i_U$ and $i_L$, respectively. The output current of the phase leg of the MMC 102 is denoted as $i_o$, which flows to the load 115. Accordingly, a circulating current $i_{cir}$ of the phase leg of the MMC 102 can be defined as an average current of the upper arm current $i_U$ and the lower arm current $i_L$:

$$i_{cir} = (i_U + i_L)/2, \tag{1}$$

which will be discussed in greater detail with respect to FIG. 4. The MMC 102 can also include an arm inductor for each of the upper arm 103 and the lower arm 106, as shown in FIG. 1.

Figure 4:
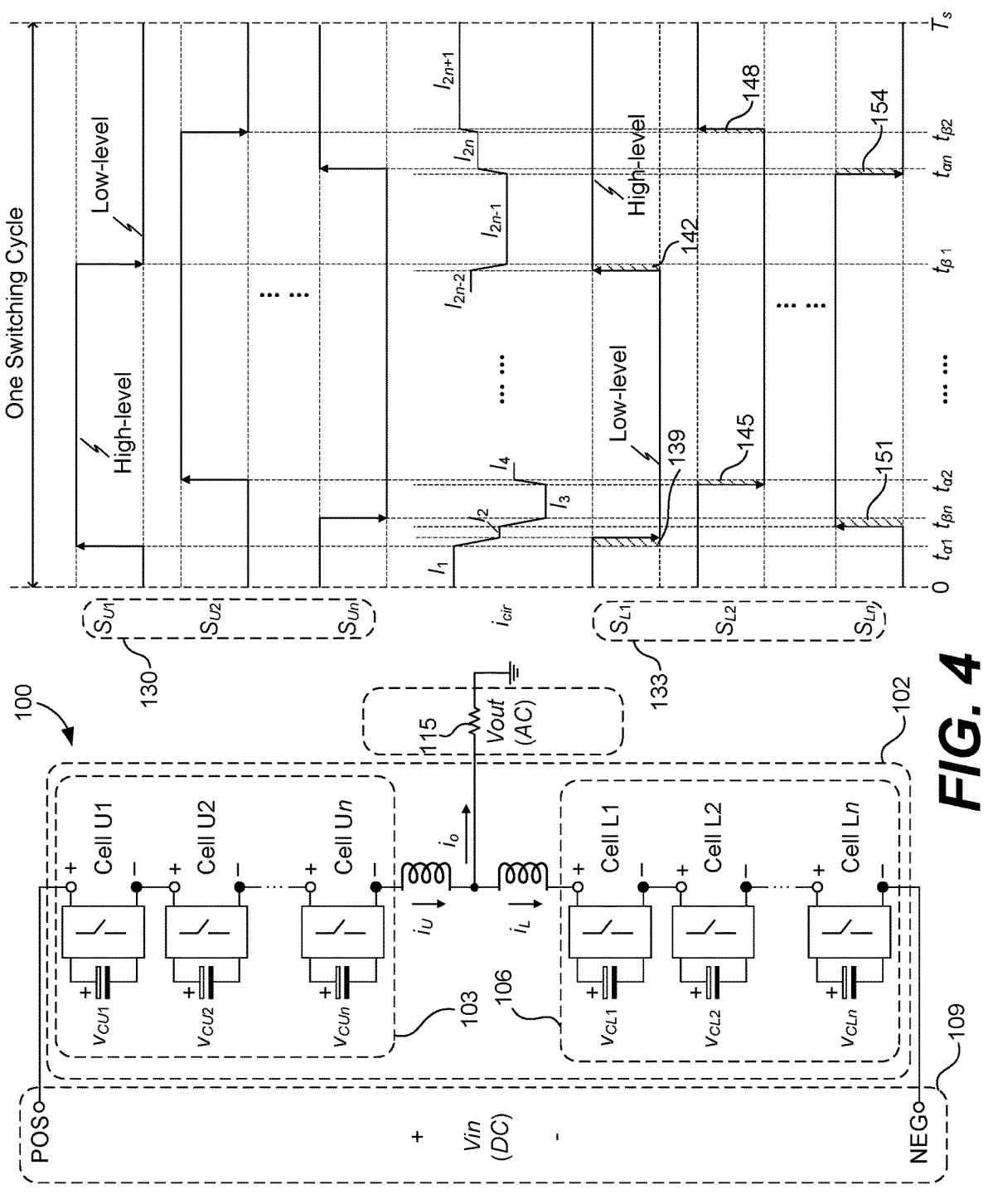
FIG. 4 illustrates an exemplary waveform of switching actions that can be implemented in the MMC shown in FIG. 1 in a time duration of a switching cycle in accordance with various embodiments described herein.

Moving onto FIG. 4, illustrated is an exemplary waveform of switching actions that can be implemented in the MMC 102 in a switching cycle $T_s$ in accordance with various embodiments described herein. FIG. 4 shows the power converter system 100 and exemplary operating waveforms of switching actions of each power cell of the upper arm 103 and the lower arm 106 in one switching cycle. Upper switching actions 130 of the switching control signals are denoted as $S_{U1}$, $S_{U2}$, . . . to $S_{Un}$, which represent exemplary switching actions in one switching cycle of the upper power cells U1, U2, . . . to Un, respectively, of the upper arm 103. Lower switching actions 133 of the switching control signals are denoted as $S_{L1}$, $S_{L2}$, . . . to $S_{Ln}$, which represent exemplary switching actions in one switching cycle of the lower power cells L1, L2, . . . to Ln, respectively, of the lower arm 106. Each of the upper switching actions 130 and the lower switching actions 133 can include either a rising edge or a falling edge consistent with a switch from either a high-level to a low-level state, or from a low-level state to a high-level state, based on the switching control signals generated by the MMC controller 112.

The upper and lower arm currents are given by:

$$i_U = i_{cir} + \frac{1}{2} i_o \text{ and} \tag{2}$$

$$i_L = i_{cir} - \frac{1}{2} i_o, \tag{3}$$

while capacitor voltage changes in one switching cycle of each power cell are given by:

$$\Delta v_{CUk} = \frac{1}{C} \sum_{i=1}^{2n+1} \left( I_i + \frac{1}{2} i_o \right) \cdot S_{Uk,i} \cdot \Delta t_i, k = 1, 2, \ldots n \text{ and} \tag{4}$$

$$\Delta v_{CLk} = \frac{1}{C} \sum_{i=1}^{2n+1} \left( I_i - \frac{1}{2} i_o \right) \cdot S_{Lk,i} \cdot \Delta t_i, k = 1, 2, \ldots n, \tag{5}$$

where Equation 4 corresponds to capacitor voltage changes for a capacitor of each power cell of the upper arm 103, and Equation 5 corresponds to capacitor voltage changes for a capacitor of each power cell of the lower arm 106, in one switching cycle.

With respect to Equations 4 and 5, the value of k corresponds to an expandable range of numbers of the quantity of the power cells of the upper arm 103 and the lower arm 106 that the MMC 102 can employ. In various embodiments, the lower arm 106 can be complementary to the upper arm 103 of the MMC 102, which can result in the upper power cells U1, U2, . . . to Un and the lower power cells L1, L2, . . . to Ln having an equal number (n) of power cells each. The value of $\Delta t_i$ can correspond to an individual time duration section of the switching cycle $T_s$ shown in FIG. 3. Based on Equations 4 and 5, with 2n switching actions separating one switching cycle $T_s$ into 2n+1 sections, the time duration $T_s$ of the switching cycle can be divided into a total of 2n+1 sections, resulting in the time duration section $\Delta t_i$ ranging from $\Delta t_1$ to $\Delta t_{2n+1}$.

To minimize capacitor voltage ripples of each power cell of the upper arm 103 and the lower arm 106 in the phase leg of the MMC 102, the MMC controller 112 is configured to evaluate a circulating current pattern of $i_{cir}$, over a range from $I_1$ to $I_{2n+1}$ in accordance with the 2n+1 time duration sections as discussed above. In this respect, each average value of $I_1$ to $I_{2n+1}$ can be associated with each time duration section $\Delta t_1$ to $\Delta t_{2n+1}$ of the switching cycle $T_s$. The MMC controller 112 can also evaluate the derived circulating current pattern of $i_{cir}$, or the derived arm current pattern, ranging from $I_1$ to $I_{2n+1}$, as a solution to the following equality constraints:

$$\Delta v_{CUk}(I_1, I_2, \ldots I_{2n+1}) = 0, k = 1, 2, \ldots n \text{ and} \tag{6}$$

$$\Delta v_{CLk}(I_1, I_2, \ldots I_{2n+1}) = 0, k = 1, 2, \ldots n. \tag{7}$$

By solving the equality constraints based on the output current $i_o$, the upper switching actions 130, the lower switching actions 133, and the power cell capacitance C of the upper power cells U1, U2, . . . to Un and the lower power cells L1, L2, . . . to Ln, the MMC controller 112 can obtain the average values of $I_1$ to $I_{2n+1}$ of the circulating current $i_{cir}$. With the derived circulating current pattern, the MMC controller 112 can control the timings of the upper switching actions 130 and the lower switching actions 133, so that the power cells of the upper arm 103 and the lower arm 106 have reduced or negated capacitor voltage deviation by the end of the switching cycle $T_s$.

In various embodiments, the MMC controller 112 is configured to generate delays or offsets between certain upper switching actions 130 and lower switching actions 133 to track the derived circulating current pattern $I_1$ to $I_{2n+1}$ within the phase leg of the MMC 102. For example, the lower switching actions 133 can each include delays 139, 142, 145, 148, 151, and 154 as compared to the upper switching actions 130. Comparing $S_{L1}$ of the lower switching actions 130 with $S_{U1}$ of the upper switching actions 130, the first falling edge of $S_{L1}$ (indicated by downwards arrow) does not occur at the same time as the first rising edge (indicated by upwards arrow) of $S_{U1}$. In addition, the subsequent rising edge (indicated by upwards arrow) of $S_{L1}$ does not occur at the same time as the subsequent falling edge (indicated by downwards arrow) of $S_{U1}$. Rather, the MMC controller 112 implements a delay between the first rising edge of $S_{U1}$ and the first falling edge of $S_{L1}$, represented by the delay 139, and a delay between the subsequent falling edge of $S_{U1}$ and the subsequent rising edge of $S_{L1}$, represented by the delay 142.

With respect to $S_{L2}$ of the lower switching actions 133 in comparison to $S_{U2}$ of the upper switching actions 130, the MMC controller 112 generates the delay 145 between the first rising edge of $S_{U2}$ and the first falling edge of $S_{L2}$. The delay 148 is generated between the subsequent falling edge of $S_{U2}$ and the subsequent rising edge of $S_{L2}$. With respect to $S_{Ln}$ of the lower switching actions 133 in comparison to $S_{Un}$ of the upper switching actions 130, the MMC controller 112 generates the delay 151 between the first falling edge of $S_{Un}$ and the first rising edge of $S_{Ln}$. The delay 154 is generated between the subsequent rising edge of $S_{Un}$ and the subsequent falling edge of $S_{Ln}$.

The MMC controller generates the delays or offsets 139, 142, 145, 148, 151, and 154 based on the inputs $V_{CU}$, $V_{CL}$, $i_U$, $i_L$, and $i_o$ (FIG. 1). The delays 139, 142, 145, 148, 151, and 154 can include phase-shift delays in some examples, which can create shoot-through periods that induce high di/dt in the MMC 102. The MMC controller 112 can further be configured to adjust the duration of the delays 139, 142, 145, 148, 151, and 154 based on the solution of the equality constraints in Equations 6 and 7. Based on the duration of the delays 139, 142, 145, 148, 151, and 154 that are implemented between the upper switching actions 130 and the lower switching actions 133, the derived circulating current pattern $I_1$ to $I_{2n+1}$ can be maintained for the switching cycle $T_s$. As a result, capacitor voltage deviations in the power cells of the upper arm 103 and the lower arm 106 may be minimized or negated in the switching cycle $T_s$. With the implementation of the derived circulating current pattern $I_1$ to $I_{2n+1}$, the MMC 102 can be operated under low frequency output or even DC-DC conversion mode (or near DC-DC conversion mode) according to various embodiments.

Figure 5:
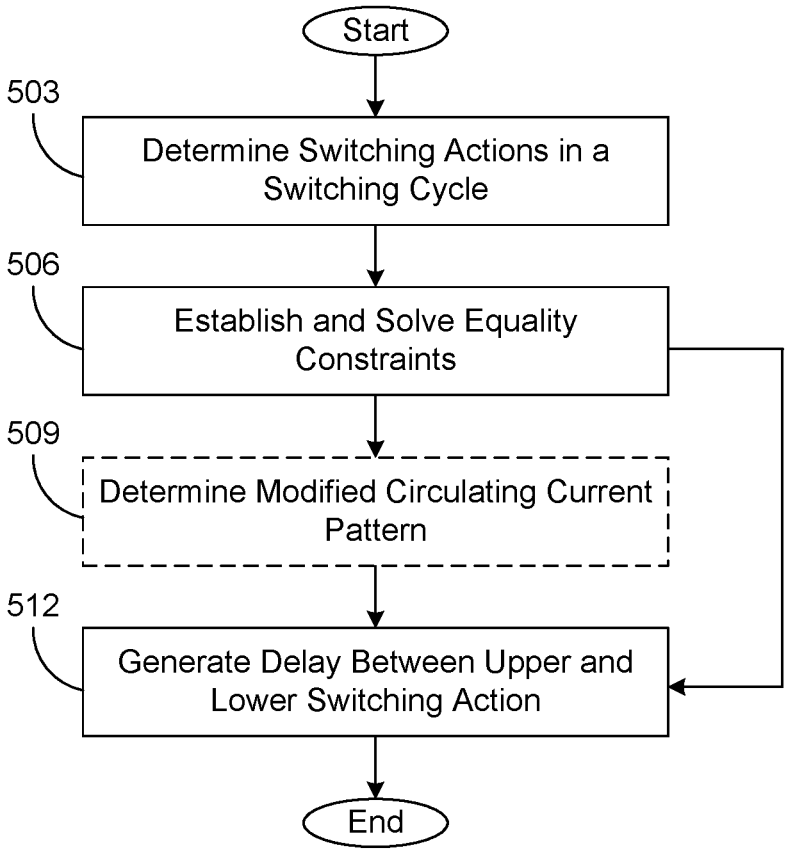
FIG. 5 is a flowchart illustrating exemplary steps of a method for capacitor voltage deviation control for a MMC in a time duration of a switching cycle in accordance with various embodiments described herein.

FIG. 5 is a flowchart outlining the steps of a method for capacitor voltage deviation control for an MMC according to various embodiments. In box 503, the method can include a controller of an MMC determining upper switching actions of upper power cells in an upper arm of a phase leg of a MMC in a switching cycle. The method can also include the controller determining lower switching actions of lower power cells in a lower arm of the phase leg of the MMC in the switching cycle. The upper and lower switching actions can include a switch from a high-level to a low-level state, or a switch from a low-level to a high-level state.

Referring back to FIGS. 1 and 4 for an example, the MMC controller 112 can be configured to determine the upper switching actions 130 for the upper power cells U1, U2, . . . to Un and the lower switching actions 133 for the lower power cells L1, L2, . . . to Ln in a switching cycle. FIG. 4 illustrates an exemplary waveform of potential switching actions able to be implemented by the power cells in the upper arm 103 and the lower arm 106 based on switching control signals generated by the MMC controller 112 during the switching cycle $T_s$. However, different combinations of switching actions (e.g., from a high-level to a low-level state or from a low-level to a high-level state) can be implemented across the power cells of the upper arm 103 and the lower arm 106 than the ones depicted over $T_s$, based on switching control signals generated by the MMC controller 112.

In some embodiments, the lower switching actions 133 can be complementary to the upper switching actions 130. For example, a respective lower power cell of the lower power cells L1, L2, . . . to Ln can be configured so that when a respective upper power cell of the upper power cells U1, U2, . . . to Un switches to a high-level state, the respective lower power cell switches to a low-level state, or vice-versa. Each respective lower power cell can be configured to switch to complementary switching states as compared to those of each respective upper power cell. For example, power cell L1 can be configured to switch to complementary switching states as compared to those of power cell U1, power cell L2 can be configured to switch to complementary switching states as compared to those of power cell U2, and power cell Ln can be configured to switch to complementary switching states as compared to those of power cell Un.

The upper switching actions 130 and the lower switching actions 133 may be determined by the MMC controller 112 based on a selected modulation mode or scheme. The MMC controller 112 can select a modulation mode for a particular submodule of the upper arm 103 or the lower arm 106, select a different modulation mode between the upper arm 103 and the lower arm 106, or select the same modulation mode for the upper arm 103 and the lower arm 106. The selected modulation mode may include nearest-level pulse-width modulation, carrier phase-shift based modulation, among other modulation modes.

Moving onto box 506, the method can include a controller for the MMC establishing and solving a number of equality constraints to determine a derived circulating current pattern. Referring back to FIG. 4, the circulating current $i_{cir}$ in the MMC 102 can be composed of the average of the upper arm current $i_U$ and the lower arm current $i_L$ (Equation 1). In order to balance the capacitor voltages (reduce capacitor voltage ripples) of the power cells of the upper arm 103 and the lower arm 106 during the switching cycle $T_s$, the circulating current pattern can range from $I_1$ to $I_{2n+1}$, with n being an integer corresponding to an expandable quantity of cells able to be implemented in each arm of the phase leg of the MMC 102. Each average value of $I_1$ to $I_{2n+1}$ can be associated with each time duration section $\Delta t_1$ to $\Delta t_{2n+1}$ of the switching cycle $T_s$.

The average values of $I_1$ to $I_{2n+1}$ can be solutions to the equality constraints listed in Equations 6 and 7, in one example. By solving the equality constraints based on the output current $i_o$, the upper switching actions 130, the lower switching actions 133, and the power cell capacitance C of the power cells of the upper arm 103 and the lower arm 106, the average values of $I_1$ to $I_{2n+1}$ of the circulating current $i_{cir}$ can be obtained. Based on the derived average values of $I_1$ to $I_{2n+1}$, the MMC controller 112 may regulate the circulating current $i_{cir}$ within the MMC 102 by adjusting the upper switching actions 130 or the lower switching actions 133.

After box 506, the controller for the MMC may go directly to box 512 in some embodiments to generate delays or offsets between upper and lower switching actions of upper and lower power cells of the MMC. For example, with the derived circulating current pattern determined in box 506, delays may be generated between the upper switching actions 130 and the lower switching actions 133 by the MMC controller 112 to regulate the circulating current $i_{cir}$. Referring back to FIG. 4, the delays 139, 142, 145, 148, 151, and 154 are generated between the upper switching actions 130 and the lower switching actions 133, thereby regulating the circulating current $i_{cir}$ based on the derived average values of $I_1$ to $I_{2n+1}$. The delays or offsets 139, 142, 145, 148, 151, and 154 can be generated by the MMC controller 112 based on the inputs $V_{CU}$, $V_{CL}$, $i_U$, $i_L$, and $i_o$ (FIG. 1) and can include phase-shift delays in some examples, which can create "shoot-through" periods that induce high di/dt within the MMC 102.

The MMC controller 112 can be configured to adjust the duration of the delays 139, 142, 145, 148, 151, and 154 based on the derived average values of $I_1$ to $I_{2n+1}$. Based on the duration of the delays 139, 142, 145, 148, 151, and 154 that are implemented between the upper switching actions 130 and the lower switching actions 133, the derived circulating current pattern $I_1$ to $I_{2n+1}$ can be maintained during the switching cycle $T_s$. In some cases, the duration of the delays 139, 142, 145, 148, 151, and 154 may be determined based on a peak current mode (PCM) modulation based on at least one arm current boundary crossing identified for the upper arm 103 or the lower arm 106 of the phase leg of the MMC 102. By regulating the circulating current $i_{cir}$ based on the derived circulating current pattern $I_1$ to $I_{2n+1}$, capacitor voltage deviations of the power cells in the upper arm 103 and the lower arm 106 can be reduced or negated during the switching cycle $T_s$. By balancing capacitor voltages, or even negating capacitor voltage deviations of power cells in a MMC in the time frame of a switching cycle, passive component requirements (e.g., in size, capacity, etc.) within the MMC may be greatly reduced, thereby reducing the volume and cost of the MMC. Thereafter, the portion of the method for capacitor voltage deviation control for the MMC may end.

In some embodiments, after box 506, the controller for the MMC may move to box 509. In box 509, the controller for the MMC can be configured to determine a modified circulating current pattern to further balance capacitor voltages (reduce capacitor voltage ripples) of power cells in the MMC. Referring back to FIG. 4, Indirectly controlling submodule (power cell) capacitor voltages by regulating the circulating current $i_{cir}$ can overlook various errors, delays, and noises that might be observed during practical implementation. In such scenarios, the circulating current $i_{cir}$ and its regulation can be compromised, which could result in further deviation of submodule capacitor voltages within the switching cycle $T_s$. To mitigate these factors, the capacitor voltages ($v_{CU1}$-$v_{CUn}$) of the upper power cells U1, U2, . . . to Un of the upper arm 103 and the capacitor voltages ($v_{CL1}$-$v_{CLn}$) of the lower power cells L1, L2, . . . to Ln of the lower arm 106 can be further regulated using additional capacitor voltage balancing techniques.

The additional capacitor voltage balancing techniques can include modifying independent physical control parameters $I_i$ and $\Delta t_i$ to regulate the capacitor voltage deviations $\Delta v_{CUk}$ and $\Delta v_{CLk}$ (Equations 4 and 5). A direct relationship between the submodule capacitor voltage deviations and independent physical control parameter changes may be non-linear and difficult to achieve. To obtain a linear and one-to-one relationship between the control variables, the MMC controller 112 can implement a reduced small signal modeling (RSSM) control method. To implement the RSSM control method, the MMC controller 112 can introduce several small perturbations in the independent control parameters of the voltage balancing equations (Equations 4 and 5), which result in modified submodule capacitor voltage deviation equations listed below:

$$\Delta v_{CUk} + \delta v_{CUk} = \frac{1}{C} \sum_{i=1}^{2n+1} \left( I_i + \frac{1}{2} i_o + \delta I_i \right) \cdot S_{Uk,i} \cdot (\Delta t_i + \delta t_i), \tag{8}$$

$$k = 1, 2, n \text{ and}$$

$$\Delta v_{CLk} + \delta v_{CLk} = \frac{1}{C} \sum_{i=1}^{2n+1} \left( I_i - \frac{1}{2} i_o + \delta I_i \right) \cdot S_{Lk,i} \cdot (\Delta t_i + \delta t_i), \tag{9}$$

$$k = 1, 2, n.$$

The modified submodule capacitor voltage deviation equations include the addition of excess perturbations $\delta v_{CUk}$ and $\delta v_{CLk}$ to $\Delta v_{CUk}$ and $\Delta v_{CLk}$ (Equations 4 and 5) in the submodule capacitors. The addition of $\delta I_i$ and $\delta t_i$ include perturbations introduced in the circulating current $I_i$ and the time duration sections $\Delta t_i$, respectively. Based on this set of equations, a control matrix can be derived to transform the physical control variables into a set of modified control variables: $\lambda_k (= f(\delta I_i, \delta t_i))$.

Based on the modified control variables, the MMC controller 112 can derive a one-to-one relationship between $\Delta v_{\alpha uk, \alpha=U/L}$ and $\lambda_k$. Consequently, the capacitor voltages of the submodules can be controlled by controlling the modified control variables, which in turn can translate into controlling the physical control variables. This modified capacitor voltage balancing technique can thus balance the submodule capacitor voltages even in case of measurement errors, delays, or noises in arm currents. Thereafter, the controller for the MMC can move to box 512, which is discussed in detail in the preceding paragraphs.

The flowchart of FIG. 5 shows an exemplary implementation of the methods described herein, as applied to the steps of a method for capacitor voltage deviation control for an MMC. Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components described herein, including the MMC controller 112 can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for control of a modular multilevel converter (MMC), comprising:

determining, by a controller device, an upper switching action of an upper power cell in an upper arm of a phase leg of the MMC within a time duration of a switching cycle for the MMC;

determining, by the controller device, a lower switching action of a lower power cell in a lower arm of the phase leg of the MMC within the time duration of the switching cycle for the MMC;

solving, by the controller device, equality constraints within the time duration of the switching cycle to obtain a derived circulating current for the upper arm and the lower arm, the equality constraints comprising capacitor voltage changes for at least one capacitor in the upper arm and capacitor voltage changes for at least one capacitor in the lower arm; and generating, by the controller device, a delay between the upper switching action and the lower switching action based on the derived circulating current obtained from solving the equality constraints to reduce capacitor voltage deviation between the upper power cell and the lower power cell during the switching cycle.

2. The method of claim 1, wherein solving the equality constraints sets a voltage change of a capacitor of at least one of the upper power cell and the lower power cell to be zero during the time duration of the switching cycle.

3. The method of claim 2, wherein the voltage change of the capacitor is based on an average circulating current through the upper arm and the lower arm during the time duration of the switching cycle, a capacitance of the capacitor, a type of switching action of the at least one of the upper power cell and the lower power cell, and an output current of the phase leg.

4. The method of claim 1, wherein obtaining the derived circulating current comprises determining, by the controller device, a derived circulating current pattern for upper power cells in the upper arm of the phase leg and for lower power cells in the lower arm of the phase leg over the switching cycle of the MMC based on solving the equality constraints.

5. The method of claim 4, wherein the derived circulating current pattern comprises a derived circulating current for each time duration among a plurality of time durations within the switching cycle of the MMC.

6. The method of claim 1, wherein the upper switching action comprises a switch of the upper power cell from a high level to a low level or from a low level to a high level.

7. The method of claim 6, wherein the high level comprises a positive capacitor connection of the upper power cell and the low level comprises a bypass connection or a negative capacitor connection of the upper power cell.

8. The method of claim 1, wherein the delay is regulated based on a reduced small signal modeling (RSSM) control method.

9. The method of claim 1, wherein the upper switching action comprises a nearest-level pulse width modulation switching action or a carrier phase-shift based modulation switching action.

10. The method of claim 1, wherein the upper power cell comprises a capacitor and a switch network.

11. A modular multilevel converter (MMC), comprising:

a phase leg comprising an upper arm and a lower arm, the upper arm comprising an upper power cell and the lower arm comprising a lower power cell; and a controller configured to:

determine an upper switching action of the upper power cell within a time duration of a switching cycle for the MMC;

determine a lower switching action of the lower power cell within the time duration of the switching cycle for the MMC;

solve equality constraints within the time duration of the switching cycle to obtain a derived circulating current for the upper arm and the lower arm, the equality constraints comprising capacitor voltage changes for at least one capacitor in the upper arm and capacitor voltage changes for at least one capacitor in the lower arm; and generate a delay between the upper switching action and the lower switching action based on the derived circulating current obtained from solving the equality constraints to reduce capacitor voltage deviation between the upper power cell and the lower power cell during the switching cycle.

12. The MMC of claim 11, wherein, to solve the equality constraints, the controller is further configured to set a voltage change of a capacitor of at least one of the upper power cell and the lower power cell to be zero during the time duration of the switching cycle.

13. The MMC of claim 12, wherein the voltage change of the capacitor is based on an average circulating current through the upper arm and the lower arm during the time duration of the switching cycle, a capacitance of the capacitor, a type of switching action of the at least one of the upper power cell and the lower power cell, and an output current of the phase leg.

14. The MMC of claim 11, wherein the controller, in being configured to obtain the derived circulating current, is configured to determine a derived circulating current pattern for upper power cells in the upper arm of the phase leg and for lower power cells in the lower arm of the phase leg over the switching cycle of the MMC based on solving the equality constraints.

15. The MMC of claim 14, wherein the derived circulating current pattern comprises a derived circulating current for each time duration among a plurality of time durations within the switching cycle of the MMC.

16. The MMC of claim 11, wherein the lower switching action comprises a switch of the lower power cell from a low level to a high level or from a high level to a low level.

17. The MMC of claim 16, wherein the high level comprises a positive capacitor connection of the lower power cell and the low level comprises a bypass connection or a negative capacitor connection of the lower power cell.

18. The MMC of claim 11, wherein the lower power cell comprises a switch network.

* * * * *